(12) United States Patent
Hahm

(10) Patent No.: US 7,467,682 B1
(45) Date of Patent: Dec. 23, 2008

(54) MOTORCYCLE FORWARD SHIFT CONTROL

(75) Inventor: Scott W. Hahm, Cedarburg, WI (US)

(73) Assignee: SWH Enterprise, LLC, Cedarburg, WI (US)

( * ) Notice: Subject to any disclaimer, the term of this patent is extended or adjusted under 35 U.S.C. 154(b) by 389 days.

(21) Appl. No.: 11/418,738

(22) Filed: May 5, 2006

(51) Int. Cl.
*B62D 61/02* (2006.01)
*B60K 20/00* (2006.01)

(52) U.S. Cl. .............. 180/230; 180/219; 180/336; 74/473.16; 74/17; 74/478; 74/478.5

(58) Field of Classification Search ............ 180/230, 180/219, 336; 74/473.16, 473.17, 478, 478.5
See application file for complete search history.

(56) References Cited

U.S. PATENT DOCUMENTS

| | | | |
|---|---|---|---|
| 2,600,767 A | 6/1952 | Herrell | |
| 3,964,564 A | 6/1976 | Pittarelli | |
| 5,299,652 A | 4/1994 | Bevins | |
| 5,507,200 A | 4/1996 | Reed et al. | |
| 5,661,999 A | 9/1997 | Carone | |
| 6,042,171 A | 3/2000 | Hesse | |
| 6,308,797 B1 * | 10/2001 | Hacker et al. | 180/230 |
| 6,394,214 B1 | 5/2002 | Hahm | |
| 6,786,312 B1 * | 9/2004 | Osborne | 192/13 R |
| 7,264,099 B2 * | 9/2007 | Duignan | 192/43.1 |
| 7,264,255 B1 * | 9/2007 | Winfrey | 180/219 |

* cited by examiner

*Primary Examiner*—Paul N Dickson
*Assistant Examiner*—Marlon A Arce Diaz
(74) *Attorney, Agent, or Firm*—Andrus, Sceales, Starke & Sawall, LLP

(57) ABSTRACT

A motorcycle shifting arrangement is connected to a transmission of the motorcycle for shifting the transmission between a higher gear and a lower gear. The motorcycle includes an original shifting structure having an original shift member pivotally mounted on an original pivot shaft coupled to the transmission at a location adjacent a foot rest attached to a bottom portion of the motorcycle. A supplemental shifting structure is pivotally attached relative to a supporting structure at a forward location on the motorcycle and has a foot engaging shift member adjacent the foot rest for permitting shifting of the motorcycle between higher and lower gears while the motorcycle operator has a foot supported on the foot rest by applying downward force of the operator's toe on either of the original shift member or the foot engaging shift member of the supplementary shifting structure.

12 Claims, 4 Drawing Sheets

MOTORCYCLE FORWARD SHIFT CONTROL

FIELD OF THE INVENTION

This invention relates broadly to motorcycles and, more particularly, pertains to a transmission forward shift control which allows for greater flexibility and comfort in shifting gears in use with motorcycles.

BACKGROUND OF THE INVENTION

Motorcycles are designed with a transmission and a foot engaging mechanism that is disposed on one side, usually the left side, of the motorcycle. The foot engaging mechanism is part of the transmission or is coupled through a pivoting arrangement to a rod which, in turn, is connected to the transmission to move the gears up for acceleration and down for deceleration. Prior art motorcycles include a foot rest in the form of a foot peg, a foot plate or floor board upon which the sole of an operator's boot or the shoe of an operator's left foot rests during travel. At least one shift lever, peg or pedal is associated with and generally located forwardly of the foot rest, the shift peg or pedal being engageable by the toe of the foot for shifting. Some motorcycles also include a second shift lever, peg or pedal located generally rearwardly of the foot rest and engageable with the heel of the foot.

As is well known, to accelerate the motorcycle, the boot or shoe is positioned under the shift lever, and with the foot resting upon the foot rest, the toe is moved upwardly each time an upward shift is desired by forcing the shift peg or pedal upwardly and moving the shift rod accordingly. To decelerate or come to a stop, the left foot must be disengaged from the foot rest so that the operator's sole is placed on top of the shift peg or pedal at which position the motorcycle may be shifted downwardly by applying an appropriate downward force and then braking as desired. For motorcycles having a shift lever, peg or pedal at the rear of the foot rest, the boot or shoe is manipulated so that the heel will push down on the rearward shift peg or pedal if upshifting is desired.

In recent years, it is become a desired practice among motorcycle enthusiasts to convert stock motorcycle transmission arrangements to forward shift controls in which an operator may have his or her legs extended forwardly, upwardly and outwardly in a rest position with his or her feet supported on highway pegs or other foot rests, and still have the ability to shift the gears of the motorcycle transmission without having to relocate the shifting foot. A properly installed forward shift control must provide some measure of adjustability so as to be usable according to the operator's individual leg length and preferred riding position during extended travel. However, such conversion arrangements generally require modification of the basic motorcycle control system such that the original shifting hardware must be removed before the forward shift controls may be added.

Applicant's U.S. Pat. No. 6,394,214 issued May 28, 2002 discloses a motorcycle shifting arrangement connected to the transmission of a motorcycle to shift the transmission between higher and lower gears. The shifting arrangement includes an original shift pedal pivotally mounted on an original pivot shaft coupled to the transmission at a location adjacent a foot rest attached to the bottom portion of the motorcycle. A primary shift lever is pivotally connected to the original pivot shaft. A secondary shift lever is pivotally connected to a supporting structure of the motorcycle. A secondary shift lever includes a foot pedal and a highway peg upon which a motorcycle operator rests his or her foot with his or her legs in an extended, raised position relative to the foot rest.

A connecting linkage has one end pivotally connected to the primary shift lever and another end pivotally connected to the secondary shift lever. With this construction, the motorcycle operator, with his or her foot resting upon the highway peg, engages the foot pedal with his or her toe to shift to a higher gear, and engages the original shift pedal with his or her heel to shift to a lower gear. The primary shift lever, the secondary shift lever and the connecting linkage are installed on the motorcycle without modification of the original shift pedal and the original pivot shaft.

While the shifting arrangement in the above described '214 patent has operated in a generally satisfactory manner, the shifting using the primary shift lever or the secondary shift lever may require moving the toe of the operator's footwear in an upward motion which can be awkward. In the case of the other prior art shifting arrangement having a foot shifting member at the rear of the foot rest, an operator may have to move his/her footwear rearwardly before downwardly engaging the foot shifting member with his/her heel which is inconvenient.

Accordingly it is desirable to provide an improved forward shift control which allows for a more comfortable and natural shifting motion of the motorcycle from the original foot rest as well as from a raised foot peg or other foot engaging member.

SUMMARY OF THE INVENTION

It is a general object of the present invention to provide a more versatile motorcycle shifting arrangement which permits the operator to downshift and upshift using a downward motion of the operator's foot.

It is one object of the present invention to provide a supplemental shifting structure for permitting shifting of the motorcycle between higher and lower gears while an operator has a foot supported on a foot rest by applying downward motion of an operator's toe on either an original shift member or a foot engaging member of the supplemental shifting structure.

It is a further object of the present invention to provide an articulated forward shift control that includes a first shift arm connected to the pivoting arrangement of the original foot engaging mechanism, a second shift arm pivotally attached to a supporting structure on the motorcycle, an activating arm pivotally attached to the supporting structure, and a linkage interconnecting the first shift arm and the actuating arm.

It is another object of the present invention to provide a more versatile motorcycle shifting arrangement which permits the operator to change gears while his or her legs are in an extended, raised position.

It is still another object of the present invention to provide a shifting linkage which may be easily installed between a support structure on a forward portion of the motorcycle and the pivoting arrangement of the original foot pedal mechanism.

It is also an object of the present invention to provide a forward shift control employing a highway peg which may be adjustably positioned relative to the original foot engaging mechanism.

It is an additional object of the present invention to provide a motorcycle forward shift control which can be installed on a motorcycle as original equipment or may be added to a motorcycle at a date following original manufacture.

In one aspect of the invention, a motorcycle shifting arrangement is connected to the transmission of a motorcycle for shifting the transmission between a higher gear and a lower gear. The motorcycle includes an original shifting structure having an original shift member pivotally mounted on an original pivot shaft coupled to the transmission at a location adjacent a foot rest attached to a bottom portion of the motorcycle. The invention is improved by a supplemental shifting structure pivotally attached relative to the supporting structure at a forward location on the motorcycle and having a foot engaging shift member adjacent the foot rest for permitting shifting of the motorcycle between higher and lower gears while a motorcycle operator has a foot supported on the foot rest by applying downward force of the operator's toe on either of the original shift member or the foot engaging shift member of the supplementary shifting structure.

In another aspect of the invention, a motorcycle shifting arrangement is connected to the transmission of a motorcycle to shift the transmission between higher and lower gears. An original shift member is pivotally mounted on an original pivot shaft coupled to the transmission at a location adjacent a rest attached to a bottom portion of the motorcycle. A first shift arm has an upper end connected to the original pivot shaft, and a lower end extending downwardly beneath the foot rest. A second shift arm is pivotally attached relative to a supporting structure of the motorcycle and has a foot engaging shift member lying adjacent the foot rest. An activating arm is pivotally coupled relative to the supporting structure of the motorcycle. A connecting linkage has one end pivotally connected to the lower end of the first shift arm, and another end pivotally secured to the activating arm. A motorcycle operator with his or her foot resting upon the foot rest engages the original shift member with his or her toe in a downward motion to shift to one gear, and engages the foot shift member on the second shift arm with his or her toe in a downward motion to shift to another gear.

A bushing is joined to the supporting structure of the motorcycle for rotatably receiving a pivot pin to which the second shift arm and the activating arm are attached. The bushing is adjustably positioned along the supporting structure of the motorcycle. The supporting structure is a roll bar or framing, and the bushing is adjustably supported to the supporting structure of the motorcycle by a bracket. The connecting linkage includes a rearward heim joint pivotally connected to the lower end of the first shift arm, and a forward heim joint connected to the activating arm. The original shift member is located on one side of the original foot rest, and the shift member on the second shift arm is positioned on another side of the original foot rest next to the original shift member.

In yet another aspect of the invention, a motorcycle forward shift control is connected to the transmission of the motorcycle to shift the transmission between one gear and another gear. The motorcycle includes an original shift member pivotally mounted on an original pivot shaft coupled to the transmission at a location adjacent a foot rest attached at the bottom of the motorcycle. A first shift arm has an upper end connected to the original pivot shaft, and a lower end extending beneath the foot rest. A second shift arm is pivotally attached relative to a supporting structure of the motorcycle and has a foot engaging shift member lying adjacent the foot rest. An actuating arm is pivotally attached relative to the supporting structure of the motorcycle. A connecting linkage has one end pivotally connected to the lower end of the first shift arm, and another end pivotally secured to the activating arm. A third shift arm is pivotally coupled relative to the supporting structure of the motorcycle and has a foot engaging shift member. A supplementary foot rest is attached to the supporting structure of the motorcycle upon which the motorcycle operator rests his or her foot in an extended raised position relative to the foot rest.

The motorcycle operator with his or her foot resting upon the foot rest engages the original shift member with his or her toe in a downward motion to shift to one gear, and engages the shift member on the second shift member with his or her toe in a downward motion to shift to another gear. The motorcycle operator with his or her foot resting upon the supplementary foot rest engages the shift member on the third shift arm with his or her toe in a downward motion to shift to one gear, and engages the shift member on the second shift arm with his or her heel in a downward motion to shift to another gear.

A bushing has an extension joined to the supporting structure of the motorcycle for rotatably receiving a pivot pin to which the second shift arm, the activating arm and the third shift arm are attached. The pivot pin has splined portions formed thereon for receiving mating end portions of the second shift arm, the third shift arm and the activating arm, and enabling various angular positioning of the second shift arm, the third shift arm and the activating arm relative to the pivot pin. The supplementary foot rest is connected to the extension on the bushing, and lies between the second shift arm and the third shift arm. The second shift arm extends towards the foot rest, and the third shift arm extends away from the foot rest. The second shift arm has another foot engaging shift member engageable with the foot of the motorcycle operator. The supplementary foot rest has a longitudinal axis which is substantially parallel to a longitudinal axis of the pivot pin.

Various other objects, features and advantages of the invention will be made apparent from the following description taken together with the drawings.

BRIEF DESCRIPTION OF THE SEVERAL VIEWS OF THE DRAWINGS

The drawings illustrate the best mode presently contemplated of carrying out the invention.

In the drawings.

DETAILED DESCRIPTION OF THE PREFERRED EMBODIMENT

Figure 1:
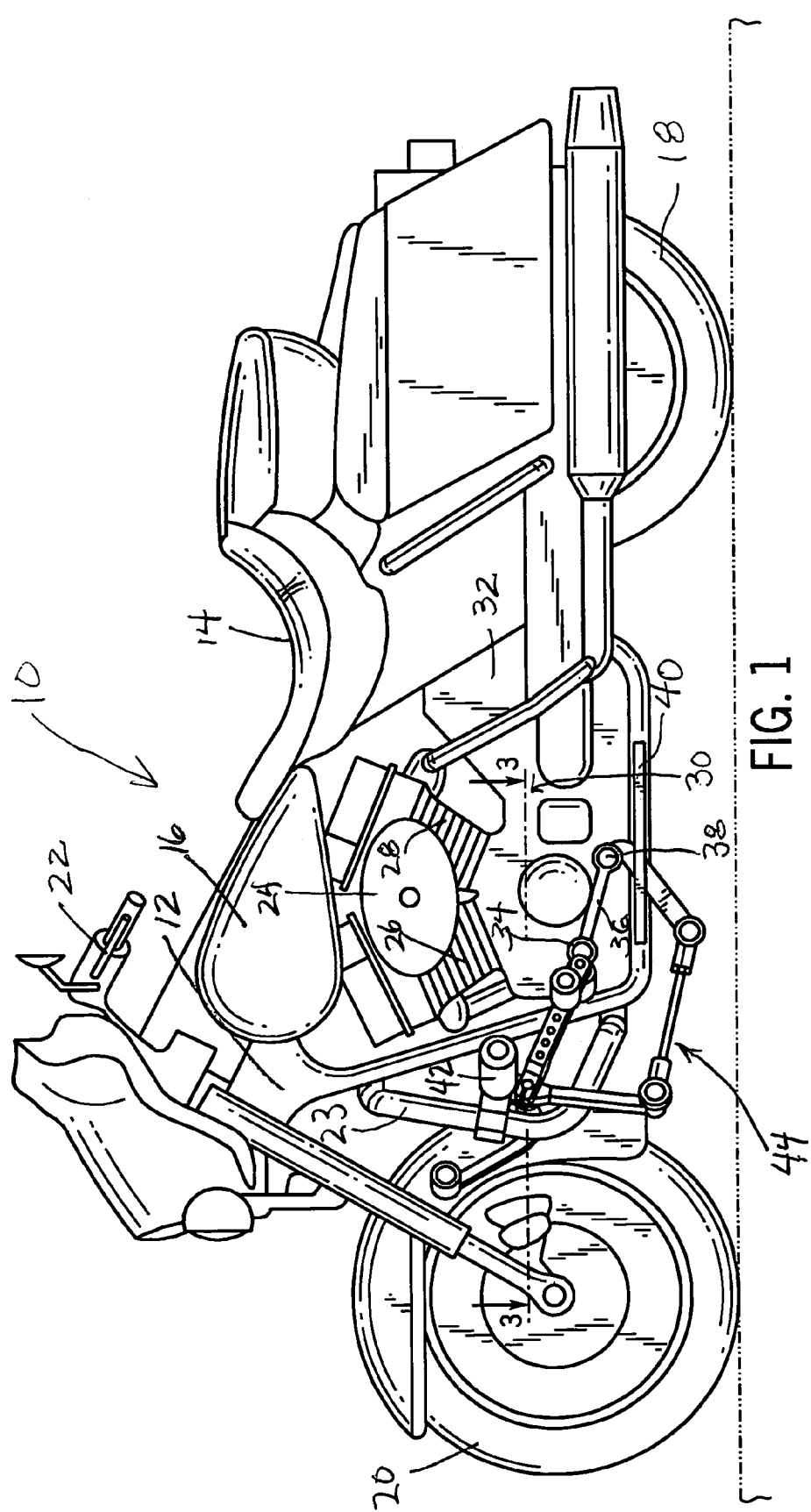
FIG. 1 is an elevational view of a motorcycle equipped with the forward shift control of the present invention.

Referring now to the drawings, FIG. 1 illustrates a conventional motorcycle 10 having a frame 12, a seat area 14, a fuel tank 16, a non-steerable rear wheel 18 and a front wheel 20 which is steerable by means of a handlebar 22. A protective and/or reinforcing supporting structure in the form of a crash or roll bar/framing 23 is attached to the forward portion of the frame 12.

Mounted within the frame 12 is a conventional internal combustion engine 24 comprising at least two cylinders 26, 28 at the bottom of which is a belt drive housing 30. A conventional transmission 32 is associated with the belt drive housing 30 to cause movement of the motorcycle 10. The transmission gearing of multiple gears is controlled through a clutch (not shown) located on the handlebar 22 so that shifting may occur through downward or upward foot pressure on a conventional shift peg 34 attached at the distal end of an offset lever 36. As is well known, the lever 36 is clamped or otherwise secured to a pivot shaft 38 extending laterally from the motorcycle 10 and connected by appropriate linkage (not shown) to a shift rod (not shown) which, in turn, is coupled to the transmission 32 to ratchet the gears upward for acceleration and down for deceleration. In the conventional shifter, there is also a foot rest in the form of a floor board or foot plate 40 which is attached to the left side of the motorcycle 10 in alignment with and behind the shift peg 34. Foot rest 40 may also take the form of a foot peg. With this type of conventional shifting mechanism, an operator engages the toe of his or her foot under the shift peg 34 to move it upwardly to upshift, and then must reposition the foot so that the toe is on top of the shift peg 34 to press downward and downshift. It is recognized that repeated upward movement of the toe is awkward and may cause discomfort to the foot and ankle and that the operator is better disposed to press the shift peg 34 downwardly. Some motorcycles conveniently include another shift lever and shift peg which is engageable with the heel of the foot at the rear of the floor board 40.

At this point, it should be appreciated that many motorcycles include a set of laterally extendable pivotable highway pegs or other foot members (one being shown at 42) which are adjustably attached to the frame 12 or a supporting structure thereof at a location generally forwardly and upwardly of the floor board 40 to enable the operator to ride with his or her legs and feet in a relaxed, raised position during extended periods of travel. It is one purpose of the present invention to provide a unique supplementary shifting structure or forward shift control 44 which enables floor shifting of the transmission 32 from the raised foot rest member 42 or the floor board 40.

Referring now to FIGS. 1-7, the basic forward shift control 44 is comprised of a first shift arm 46, a second shift arm 48, an activating arm 50, and an adjustable linkage 52 interconnecting the first shift arm 46 and the activating arm 50. As will be understood hereafter, the forward shift control 44 may also include an optional third shift arm 54 which is used in conjunction with raised foot rest member 42.

First shift arm 46 has an upper split end 56 which is clamped, such as by a fastener 58 (FIG. 2), to the original pivot shaft 38 outwardly of the offset lever 36. The upper split end 56 may be attached at various angular positions on the pivot shaft 38 as desired due to a splined connection therewith. The first shift arm 46 lies inwardly and extends downwardly at an angle beneath the floor board 40. The first shift arm 46 has a lower end 60 which is apertured to receive a bolt 62 (FIG. 2) that passes through a recess in a rearward heim joint of linkage 52 and is retained in place by a nut 63. This creates a pivotal connection between the lower end 60 of the shift arm 46 and the rear end of linkage 50. The heim joint includes an internally threaded sleeve 64 for receiving one threaded end of a curved rod 66 of linkage 52. The rod 66 has a threaded front end which is screwed into a front heim joint having an internally threaded sleeve 68. The sleeve 68 has an apertured end which is pivotally coupled to a lower end 70 of activating arm 50 by a bolt 72.

Figure 2:
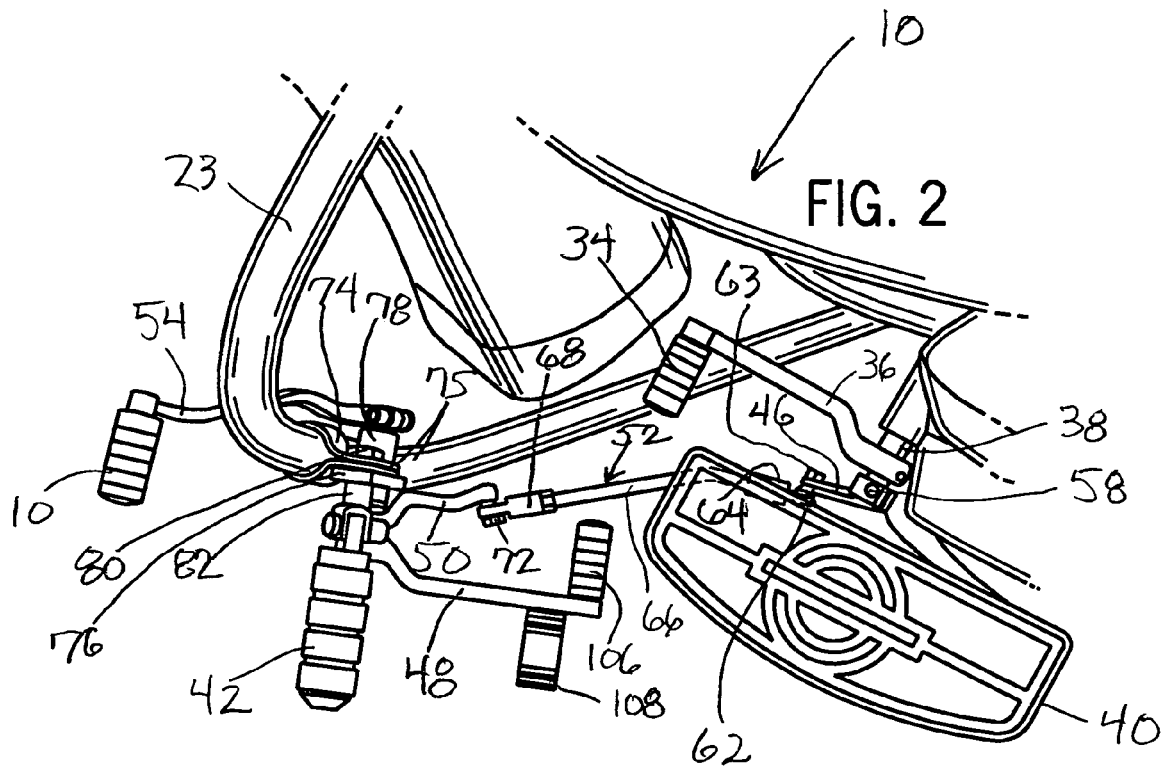
FIG. 2 is a top view of the forward shift control in FIG. 1.

As best seen in FIG. 2, a wraparound bracket 74 is provided along the roll bar 23, and is used to adjustably position the highway peg or other supplementary foot rest 42 at a preferred position along with the second shift arm 48, the activating arm 50 and the optional third shift arm 54. The bracket 74 has apertured end portions 75 which lie against a mounting extension 76 integrally formed on a tubular bushing 78. A bolt 80 passes through the apertured end portion 75 of bracket 74 and through the mounting extension 76, and is screwthreadedly attached to a holder 82 for pivotally mounting the supplementary foot rest 42.

Figure 3:
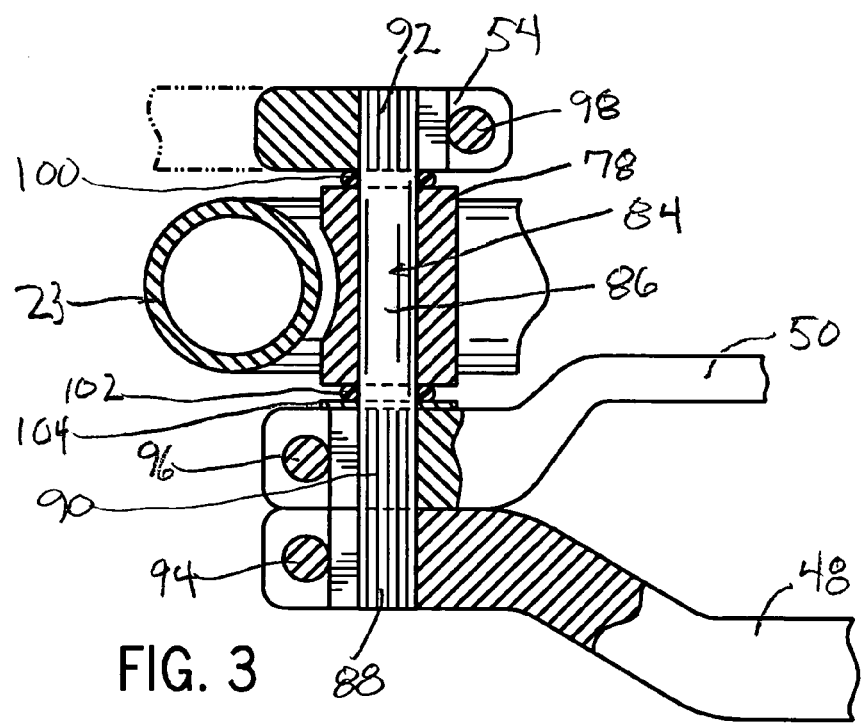
FIG. 3 is a sectional view taken on line 3-3 FIG. 2.

Referring to FIG. 3, the bushing 78 has a passageway for receiving a pivot pin 84 having end portions which extend laterally beyond both ends of the bushing 78. The pivot pin 84 has a smooth surface 86 which pivots relative to the fixed bushing 78. The pivot pin 84 also has a first splined portion 88, a second splined portion 90 and a third splined portion 92. The first splined portion 88 receives a complimentary spline portion on a split arm of second shift arm 48 which is held in place by a bolt 94. The second splined portion 90 receives a complimentary splined portion on an upper split end of activating arm 50 which is held in place by a bolt 96. The third splined portion 92 receives a complimentary splined portion of a split end of the optional third shift arm 54 which is held in place by a bolt 98. A first O-ring 100 encircles pivot pin 84 between one end of the bushing 78 and the third shift arm 54. A second O-ring 102 and a shim 104 encircle the pivot pin 84 between the other end of the bushing 78 and the activating arm 50. It should be appreciated that the splined structure allows the variable angular positioning of the second shift arm 48, the activating arm 50 and the optional third shift arm 54 relative to pivot pin 84. Arms 48, 50 and 54 will all pivot together relative to the bushing 78 which is fixed to the roll bar 23. The longitudinal axis of pivot pin 84 is substantially parallel to the longitudinal axis of the foot peg 42 but may be otherwise oriented.

The second shift arm 48 is formed with a series of spaced apart openings for attaching one or more foot engaging members. In the preferred embodiment, a primary foot engaging peg or member 106 is screwthreadedly attached at the distal, apertured end of shift arm 48, and is directed inwardly at a position adjacent to the floor board or foot rest 40 and substantially aligned with shift peg 34. A secondary foot engaging peg or member 108 is screwthreadedly attached to the other apertured end of shift arm 48, and is directed outwardly in more direct alignment with supplementary foot rest 42.

In the aforedescribed forward shift control 44, it should be appreciated that the shift peg 34 on original shift lever 34 and the foot engaging member 106 are each accessible with the toe of the operator having his/her foot on foot rest 40. Also, the operator who desires to support his/her foot on supplementary foot rest 42 in a raised position may access a foot engaging member 110 on third shift arm 54 with his/her toe, and access either foot engaging members 106 or 108 with his/her heel.

One of the foremost advantages of the present invention is that the forward shift control 44 enables shifting between higher and lower gears while an operator has a foot supported on a foot rest at the bottom of the motorcycle by applying a more natural, comfortable downward motion of the operator's toe on either the original shift member 34 or the foot engaging member 106. The present invention will also continue to provide an alternative or supplemental shifting capability from a supplementary highway peg or other foot engaging member 42 by using downward motion of the operator's toe or heel.

In many situations, the forward shift control 44 can be installed by installing the first shift arm 46 on the end of the original pivot shaft 38 without modification or removal of the original shift assembly 34, 36 and 38. In some cases, a new combined shift lever 36 and shift arm 46 may be required to be attached to the original pivot shaft 38.

Figure 6:
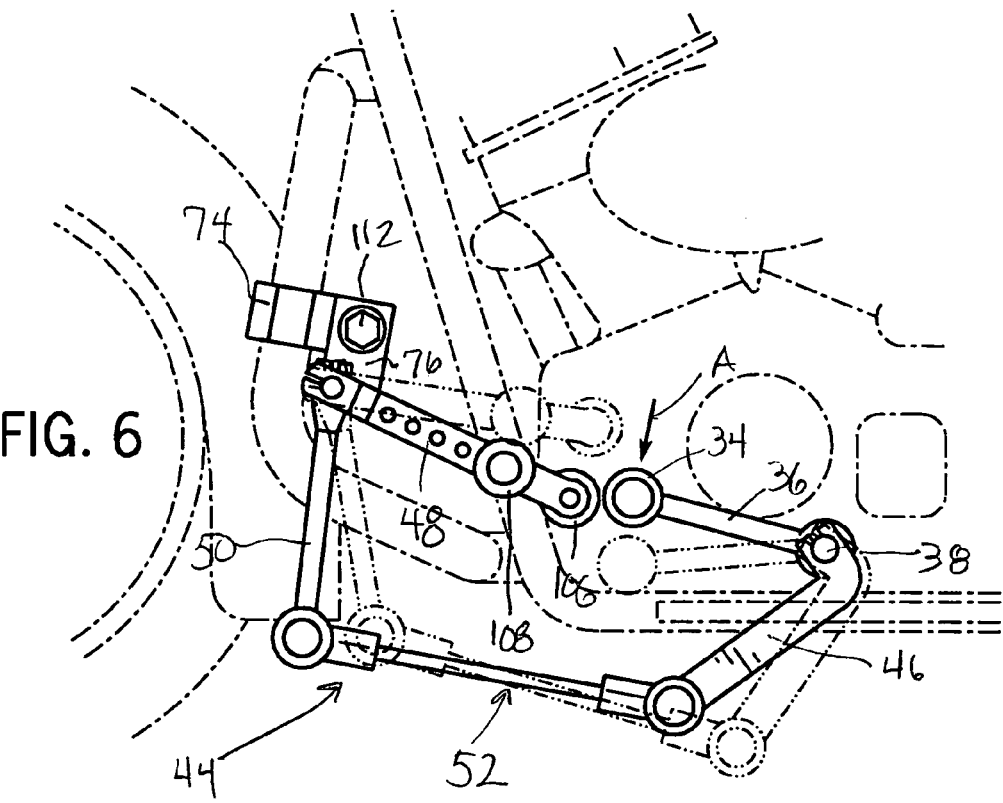
FIGS. 6 and 7 are similar to FIGS. 4 and 5 but show a simpler version of the forward shift control with no foot rest or peg on the roll bar/framing.
Figure 7:
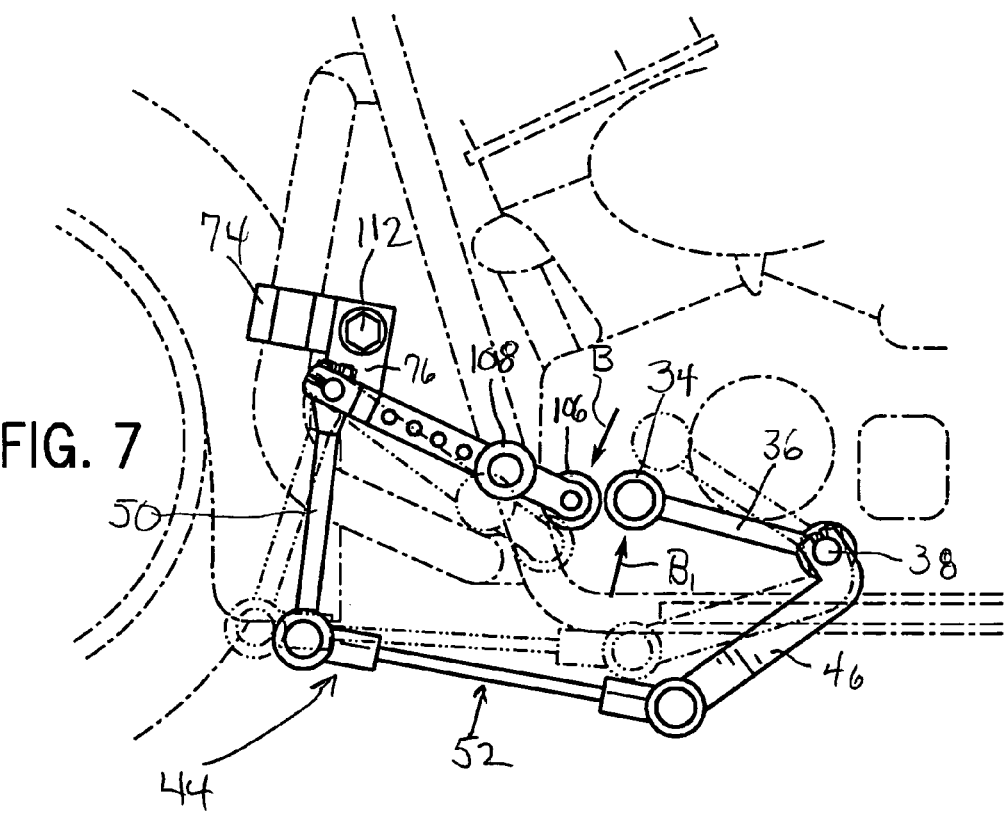

The operation will now be described in terms of the broadest form of the invention as shown in FIGS. 6 and 7 which show the supplemental foot rest 42, the holder 82 and the optional third shift arm 54 removed when shifting from the floor board or foot rest 40 is desired. A nut 112 is placed on the end of bolt 80 to hold the bracket 74 and bushing 78 in place on roll bar 23 when foot rest 42 and holder 82 are removed. In use, the motorcycle operator will have his/her foot resting on the foot rest 40. When it is desired to downshift or decelerate, the toe of the operator's boot or footwear moves to the right of foot rest 40 and engages the original shift member 34 in a downward motion. This moves the original shift lever 36 to the phantom line position shown, moves the linkage 52 and activating arm 50 rearwardly and pivots the second shift arm 48 to the phantom line position. The resulting movement is counterclockwise movement of the pivot shaft 38 so as to ratchet the gears in transmission 32 down. Original shift member 34 and shift lever 36 move downwardly in the direction of arrow A.

When it is desired to upshift or accelerate, the toe of the operator's foot moves to the left from the foot rest 40, and engages the foot engaging member 106 on second shift arm 48 in a downward motion as shown by arrow B in FIG. 7. This, in turn, translates the activating arm 50 and linkage 52 and shift arm 46 forwardly as seen in phantom lines so as to ratchet the gears in transmission up as original shift lever 36 reactively moves in the direction of arrow $B_1$.

Figure 4:
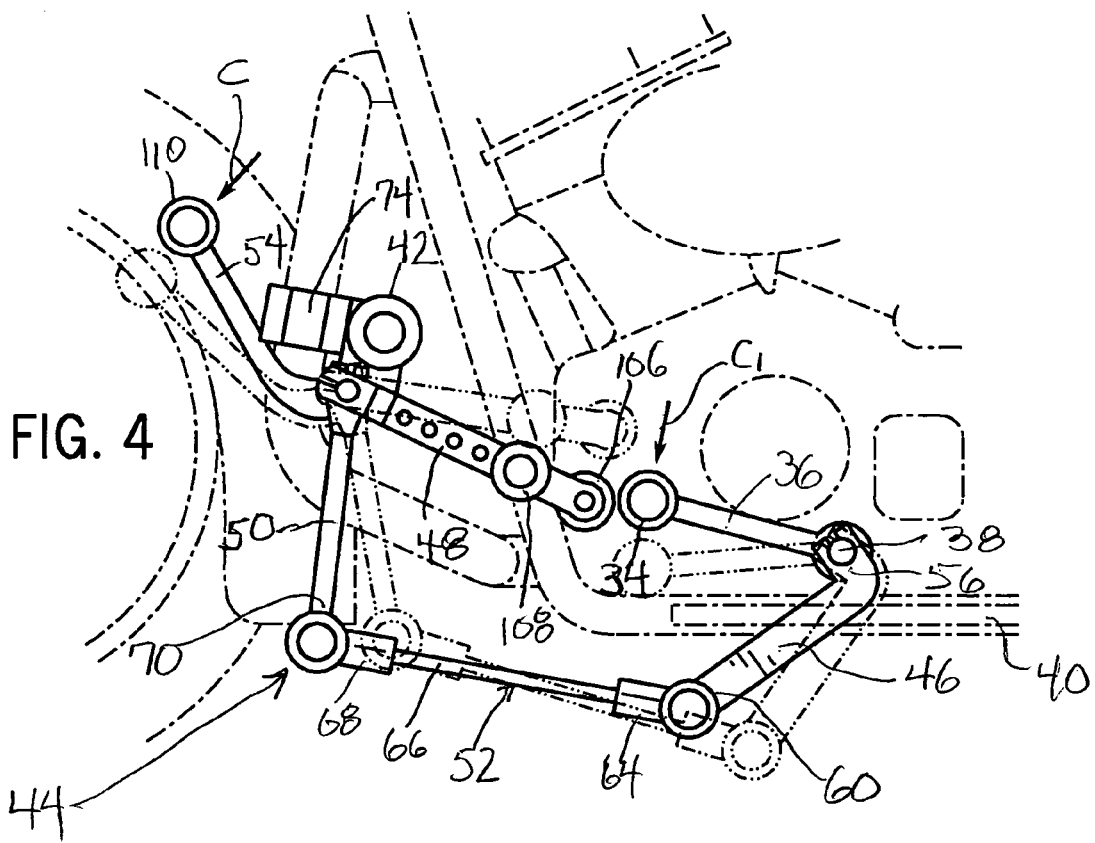
FIGS. 4 and 5 are enlarged, fragmentary views of the forward shift control showing its relative movement in phantom and solid lines.
Figure 5:
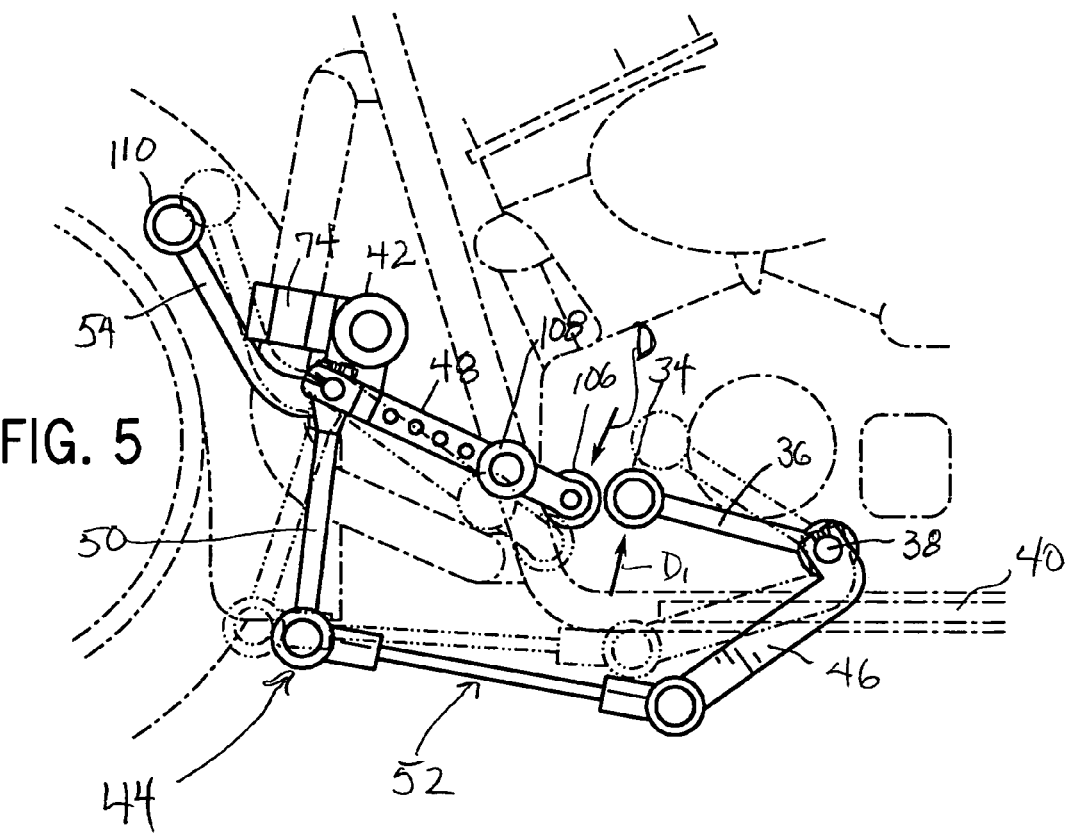

Referring now to FIGS. 4 and 5, when it is desired to shift from the raised foot position, the supplementary foot rest 42 is attached to the mounting extension 76, and third shift arm 54 is clamped to the pivot pin 84. It should be understood that the supplementary foot rest 42 could be otherwise attached to the supporting structure 23. With the sole of the operator's foot supported on the foot rest 42 at the desired vertical position on roll bar 23, an operator may push downwardly with his/her toe on foot engaging member 110 to downshift as shown by arrow C (FIG. 4). This will move the connected elements 50, 52, 46, 48 to the phantom line positions and cause the gears in transmission 32 to ratchet down. Original shift member 34 will reactively move down in the direction of arrow $C_1$. By pushing in a downward motion with his/her heel on foot engaging member 106 or 108 in the direction of arrow D (FIG. 5), upshifting will be accomplished. Original shift member 34 will reactively move up in the direction of arrow $D_1$. Shifting forwardly with one's heel on member 106 or 108 is equivalent to upshifting from the original foot rest 40 with one's toe moved upwardly against original shift member 36.

The adjustable features of the forward shift control 44 may be installed on motorcycles to adjust to the particular preferences of the operator. The forward shift control 44 relies upon downward shifting motion of the operator's foot to make shifting between gears more natural and comfortable regardless of the operator's foot position.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

I claim:

1. A motorcycle shifting arrangement connected to a transmission of a motorcycle to shift the transmission between higher and lower gears, the shifting arrangement comprising:
   an original shift member pivotally mounted on an original pivot shaft coupled to the transmission at the location adjacent a foot rest mounted to a bottom portion of the motorcycle;
   a first shift arm having an upper end connected to the original pivot shaft and a lower end extending downwardly beneath the foot rest;
   a second shift arm pivotally attached relative to a supporting structure of the motorcycle and having a foot engaging shift member lying adjacent the foot rest;
   an activating arm pivotally coupled relative to the supporting structure of the motorcycle; and
   a connecting linkage having one end pivotally connected to the lower end of the first shift arm, and another end pivotally secured to the activating arm,
   whereby a motorcycle operator with his or her foot resting upon the foot rest engages the original shift member with his or her toe in a downward motion to shift to one gear, and engages the shift member on the second shift arm with his or her toe in a downward motion to shift to another gear, and
   wherein the original shift member is located on one side of the original foot rest, and the shift member on the second shift arm is positioned on another side of the original foot rest.

2. The motorcycle shifting arrangement of claim 1, including a bushing joined to the supporting structure of the motorcycle for rotatably receiving a pivot pin to which the second shift arm and the activating arm are attached.

3. The motorcycle shifting arrangement of claim 1, wherein the bushing is adjustably positioned along the supporting structure of the motorcycle.

4. The motorcycle shifting arrangement of claim 3, wherein the supporting structure is a roll bar or framing, and the bushing is adjustably supported to the supporting structure of the motorcycle by a bracket.

5. The motorcycle shifting arrangement of claim 1, wherein the connecting linkage includes a rearward heim joint pivotally connected to the lower end of the first shift arm, and a forward heim joint connected to the activating arm.

6. A motorcycle forward shift control connected to a transmission of a motorcycle to shift the transmission between a higher gear and a lower gear wherein the motorcycle includes an original shift member pivotally mounted on an original pivot shaft coupled to the transmission at a location adjacent foot rest attached at the bottom of the motorcycle, the forward shift control comprising:
   a first shift arm having an upper end connected to the original pivot shaft, and a lower end extending beneath the foot rest;
   a second shift arm pivotally attached relative to a supporting structure of the motorcycle and having a foot engaging shift member aligned adjacent the foot rest;
   an activating arm pivotally attached relative to the supporting structure of the motorcycle;
   a connecting linkage having one end pivotally connected to the lower end of the first shift arm, and another end pivotally secured to the activating arm;
   a third shift arm pivotally coupled relative to the supporting structure of the motorcycle and having a foot engaging shift member; and
   a supplementary foot rest attached to the supporting structure of the motorcycle upon which the motorcycle operator rests his or her foot in an extended, raised position relative to the foot rest,
   whereby the motorcycle operator with his or her foot resting upon the foot rest engages the original shift member with his or her toe in a downward motion to shift to one gear, and engages the shift member on the second shift member with his or her toe in a downward motion to shift to another; and
   whereby the motorcycle operator with his or her foot resting upon the supplementary foot rest engages the shift member on the third shift arm with his or her toe in a downward direction to shift to one gear, and engages the shift member on the second shift arm with his or her heel in a downward motion to shift to another gear.

7. The forward shift control of claim 6, wherein a bushing having an extension is joined to the supporting structure of the motorcycle for rotatably receiving a pivot pin to which the second shift arm, the activating arm and the third shift arm are attached.

8. The forward shift control of claim 7, wherein the pivot pin has splined portions formed thereon for receiving mating end portions of a second shift arm, the third shift arm and the activating arm and enabling various angular positioning of the second shift arm, the third shift arm and the activating arm relative to the pivot pin.

9. The forward shift control of claim 7, wherein the supplementary foot rest is connected to the extension on the bushing, and lies between the second shift arm and the third shift arm.

10. The forward shift control of claim 6, wherein the second shift arm extends towards the foot rest, and the third shift arm extends away from the foot rest.

11. The forward shift control of claim 6, wherein the second shift arm has another foot engaging shift member engageable with the foot of the motorcycle operator.

12. The forward shift control of claim 7, wherein the supplementary foot rest has a longitudinal axis which is substantially parallel to a longitudinal axis of the pivot pin.

* * * * *